(12) United States Patent
Waller

(10) Patent No.: US 6,377,578 B1
(45) Date of Patent: Apr. 23, 2002

(54) ATM RE-ASSEMBLY CIRCUIT AND METHOD

(75) Inventor: Arthur Simon Waller, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/206,609

(22) Filed: Dec. 7, 1998

(30) Foreign Application Priority Data

Dec. 9, 1997 (GB) .............................. 9726046

(51) Int. Cl.[7] .......................... H04L 12/28; H04L 3/24
(52) U.S. Cl. ........................ 370/395; 370/474
(58) Field of Search .............................. 370/389, 392, 370/395, 397, 399, 409, 300, 474, 465

(56) References Cited

U.S. PATENT DOCUMENTS

| | | | |
|---|---|---|---|
| 5,642,347 A | 6/1997 | Buckland | 370/242 |
| 5,666,293 A | 9/1997 | Metz et al. | 395/200.5 |
| 5,742,765 A * | 4/1998 | Wong et al. | 709/230 |
| 5,867,509 A * | 2/1999 | Tanaka | 370/473 |
| 5,917,828 A * | 6/1999 | Thompson | 370/474 |
| 5,949,781 A * | 9/1999 | Lincoln et al. | 370/395 |

FOREIGN PATENT DOCUMENTS

| | | |
|---|---|---|
| EP | 0 674 461 A2 | 9/1995 |
| EP | 0 772 371 A1 | 5/1997 |

* cited by examiner

*Primary Examiner*—Wellington Chin
*Assistant Examiner*—Brenda H. Pham
(74) *Attorney, Agent, or Firm*—Frommer Lawrence & Haug LLP; William S. Frommer

(57) ABSTRACT

An ATM circuit for use in re-assembly of ATM cells containing ATM payloads comprising an input unit for receiving interleaved ATM cells derived from ATM packets relating to respective virtual channels and a checker for checking the ATM cells of an ATM packet of a selected virtual channel with respect to ATM packet trailer information contained in the ATM cells of the ATM packet, the ATM circuit being configured to output the ATM cell payloads in the original interleaved state, a main processor being configured to receive the ATM payloads output by the ATM circuit and to deinterleave the ATM cell payloads by storing the ATM cell payloads in a memory, the checker producing check data representing the results of the checking and the ATM circuit being configured to output the check data together with corresponding ATM cell payloads.

15 Claims, 4 Drawing Sheets

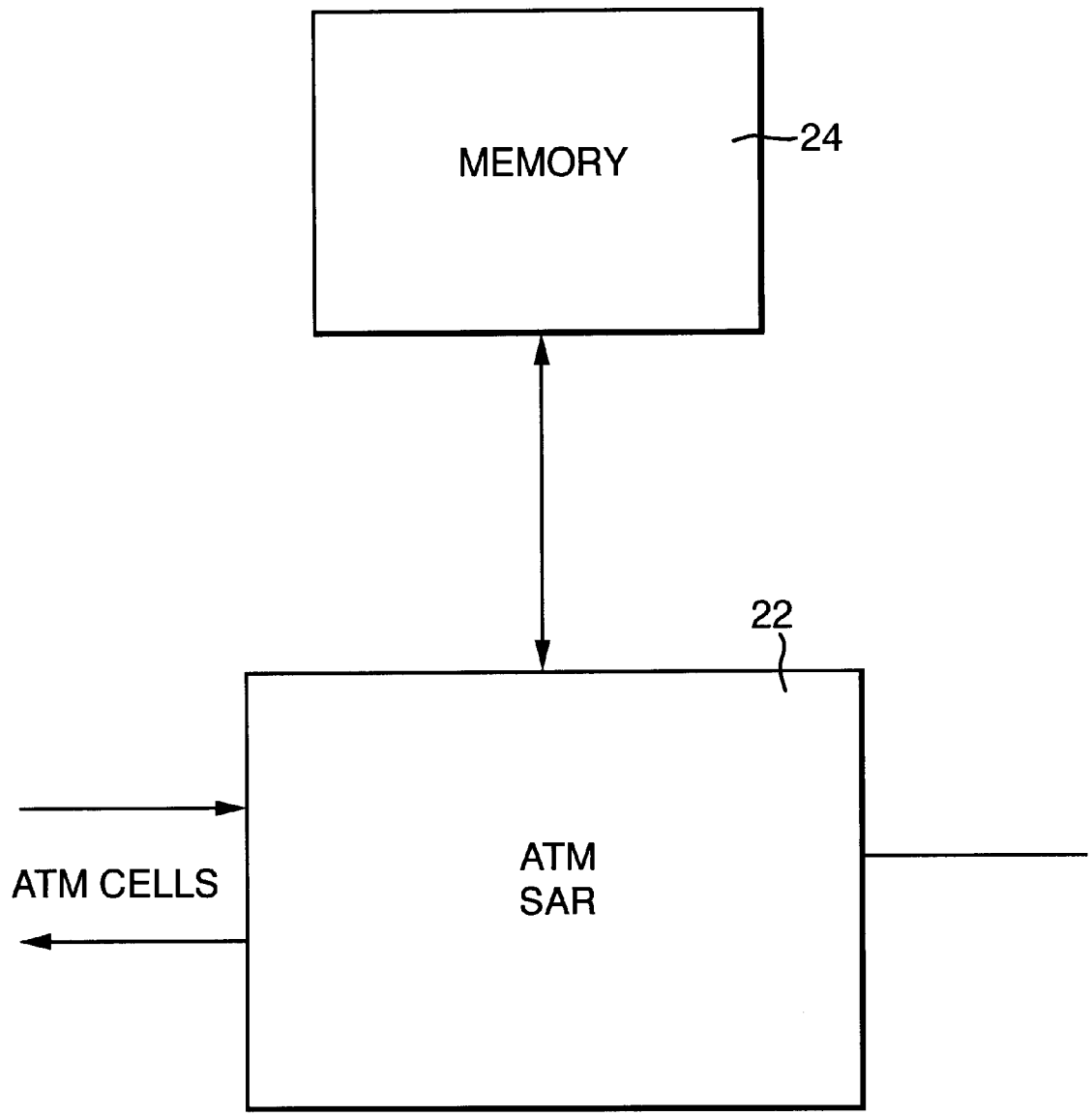

ATM RE-ASSEMBLY CIRCUIT AND METHOD

BACKGROUND OF THE INVENTION

1. Field of the Invention

The present invention relates to an ATM segmentation and re-assembly method and apparatus, more particularly to such a method and apparatus in which the components of the apparatus may be simplified.

2. Description of the Related Art

Asynchronous transfer mode (ATM) has become increasingly important over the past few years in the telecommunications industry for the transport of voice and data traffic around telecommunications networks. It is also starting to be used in local area networks to connect personal computers and other equipment together as an alternative to Ethernet. These networks are all aimed at higher and higher bit rates, both measured as the network gross bit rate and the bit rate per user. Furthermore, large numbers of virtual channels are provided on each physical link.

Another application for ATM is the transport of audio/video and other data to and from a digital set top box (STB) or other similar consumer equipment.

For general consumer equipment, cost is very important. Furthermore, for devices such as audio/video set top boxes, it is acceptable to limit the bit rate and number of virtual channels to much smaller numbers than would otherwise be used.

Integrated circuits are available for the combined process of segmentation and re-assembly (SAR) of ATM signals. These SAR integrated circuits determine whether a received ATM cell belongs to a virtual channel being used, extract the ATM payload of a required cell and add the data to the end of previously received data. Furthermore, when a cell is the last cell of a packet, they check the length and correction codes of that packet before passing the entire packet on to the next processing stage.

In order to buffer all the data of a packet as it is reassembled, a significant amount of memory is required. Furthermore, in the segmentation process, more memory is required for the buffers to hold the data packets which are to be transmitted.

It is possible to provide some dedicated memory on a separate integrated circuit, but this adds cost to the system. It is also possible to share the main memory with the processor, but this can effect the processor performance, because the memory bus has to be shared. Both methods also have the disadvantage that the SAR integrated circuit must have sufficient pins to drive the memory bus.

Currently available integrated circuits are thus relatively complicated and expensive, particularly since they are increasingly designed to handle very high bit rates and large numbers of virtual channels.

OBJECTS AND SUMMARY OF THE INVENTION

The present invention is based on a recognition of the above problem and also a recognition of the need for a simplified design, with particular application to the lower bit rates and numbers of virtual channels required for audio/video transmission.

According to the present invention, there is provided a method of reducing the workload of an ATM assembly circuit for assembling ATM packets relating to respective virtual channels from interleaved ATM cells containing ATM payloads, the method comprising:

configuring the circuit to a) check each interleaved ATM cell of an ATM packet of a selected virtual channel with respect to the ATM trailer information contained in the ATM cells of said ATM packet without deinterleaving the ATM cells, b) generate check data for each ATM cell indicating the results of the checking and c) transmit the interleaved ATM cell payloads together with the check data; and providing a processor to receive the ATM cell payloads and check data and to store the ATM cell payloads in a memory in a deinterleaved state.

By virtue of this, it is also possible to provide a method of assembling ATM packets relating to respective virtual channels from interleaved ATM cells containing respective ATM payloads, the method comprising:

receiving the interleaved ATM cells;

checking each ATM cell of an ATM packet of a selected virtual channel with respect to the ATM packet trailer information contained in the ATM cells of said ATM packet;

generating check data for each ATM cell indicating the results of the step of checking;

outputting the interleaved ATM cell payloads, together with the check data to a main processor; and operating the main processor to deinterleave the ATM cell payloads of respective virtual channels to assemble ATM packets of respective virtual channels.

Hence, also, there may also be provided an ATM circuit for use in re-assembly of ATM packets from ATM cells containing ATM payloads, the circuit comprising:

an input unit for receiving interleaved ATM cells derived from ATM packets relating to respective virtual channels; and a checker for checking the ATM cells of an ATM packet of a selected virtual channel with respect to ATM packet trailer information contained in the ATM cells of said ATM packet; wherein the ATM circuit is configured to output the ATM cell payloads in the original interleaved state.

That circuit may then be provided in a complete ATM re-assembly circuit additionally comprising a main processor for controlling the ATM re-assembly circuit;

a memory for storing deinterleaved ATM cell payloads of ATM packets; wherein the main processor is configured to receive the ATM payloads output by the ATM circuit and to deinterleave the ATM cell payloads by storing the ATM cell payloads in the memory.

In this way, a much simplified ATM circuit may be used without the need for large buffer memories.

The ATM circuit is responsible for checking the cell headers to determine the cells of required virtual channels and then checks the correction and length codes for the packets, without deinterleaving them. As each ATM cell passes through the ATM circuit, CRC information for the complete packet is built up and the length of the packet is counted. Therefore, when the last cell of a packet passes through the ATM circuit, it is possible for the ATM circuit to establish whether the packet is complete and correct and to indicate this to the further processing. The ATM circuit does not need to deinterleave and store an entire packet before carrying out these functions and, therefore, does not need the use of large buffer memories.

As mentioned above, for audio/video applications, the data rates are relatively low. The present invention can make use of this to particular advantage, since the main processor can easily handle the necessary data rates. In particular, a main processor, which would otherwise be relatively underworked, can be utilized to conduct the deinterleaving of cells.

The cell headers may be output from the ATM circuit merely with additional data indicating the results of the checks made on the ATM packets. However, since by that stage the ATM cell payloads have already been checked for errors, the ATM cell headers may be modified and the modified cell headers be stripped of the cell error correction codes.

In general, the ATM system may allow for large numbers of virtual channels, whereas for certain applications, such as audio/video applications, an ATM circuit may only operate on a few virtual channels. In these situations, it may be advantageous to modify the cell headers to indicate the virtual channels in a more simple way. In particular, since fewer virtual channels may need to be distinguished, shorter codes may be used to indicate those virtual channels.

Preferably, the ATM circuit is provided as a single integrated circuit. Such a circuit is relatively simple to construct for the reasons discussed above and, therefore, will be much cheaper for applications in set top boxes than general purpose ATM circuits.

BRIEF DESCRIPTION OF THE DRAWINGS

FIG. 1 illustrates an arrangement of a previous SAR;

DETAILED DESCRIPTION OF THE PREFERRED EMBODIMENTS

Specific embodiments of the invention will be described by way of example, with reference to the accompanying drawings.

The most common way of splitting up a data packet to fit into multiple ATM cells is to use ATM adaption layer 5 (ALL5), see ITU-T I.363: B-ISDN ATM Adaption Layer (AAL) Specification.

Figure 2A:
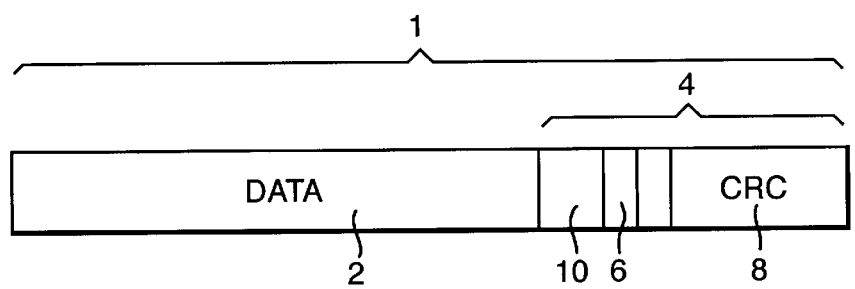
FIGS. 2(a) to (d) illustrate various stages of ATM transmission.

As illustrated in FIG. 2(a), to transmit data by ATM, an ATM packet 1 is prepared comprising a block of data 2 has an AAL 5 PDU trailer 4 added to it. The trailer 4 includes various codes including a length code 6, a CRC 8 and buffer data 10.

Figure 2B:
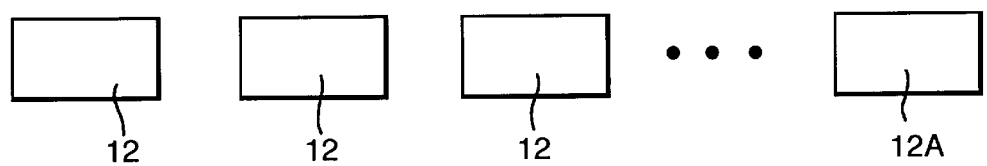

The data packet 1 of FIG. 2(a) is divided into a plurality of ATM payloads 12 as illustrated in FIG. 2(b). Each ATM payload 12 is 48 bytes long. Hence, the buffer data is included in the trailer 4 to ensure that the packet 1 is a multiple of 48 bytes long.

With current systems, the codes in the trailer 4 are never more than 48 bytes and, hence, the buffer data 10 need only be sufficient to make the trailer 4 48 bytes long so as to form the last ATM payload 12A.

Figure 2C:
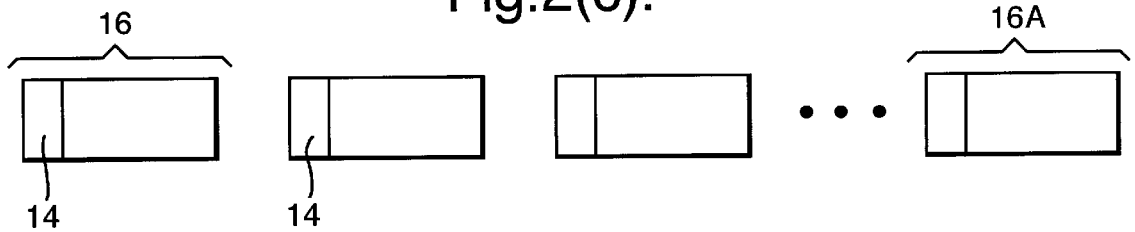

The ATM payloads 12 then have a 5 byte header 14 added to them to form ATM cells 16, as illustrated in FIG. 2(c).

The headers 14 include correction codes, information indicating the virtual channel to which the ATM cell 16 belongs and at least 1 bit indicating if the ATM cell 16 is the last ATM cell 16A. In this way, once a receiver receives the last ATM cell 16A for a particular virtual channel, it knows that it should have all of the relevant ATM cells 16 for a particular packet 1.

Figure 2D:
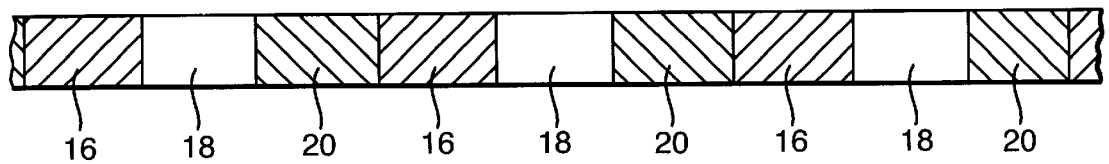

As illustrated in FIG. 2(d), for transmission, the ATM cells 16 of a particular virtual channel are interleaved with ATM cells 18, 20 of other channels. By means of the information in the headers 14 of the ATM cells 16, 18, 20, a receiver is able to distinguish the ATM cells 16, 18, 20 of different virtual channels, there being three in the case of FIG. 2(d).

When ATM cells 16, 18, 20 are received at a set top box, the cells 16 associated with virtual channels in use are extracted and the data for each channel decoded to form the original data packet 1. This process is called re-assembly and the inverse process for transmission is called segmentation. The combined process of segmentation and re-assembly (SAR) is key to the implementation of a low cost terminal.

The prior art SAR apparatus of FIG. 1 carries out re-assembly of ATM cells 16 from virtual channel X and ATM cells 18 from virtual channel Y as follows.

The SAR 22 receives the ATM cells 16, 18 and 20 and examines their headers 14 at least to establish the virtual channel to which they belong.

Having received an ATM cell 16 for virtual channel X, the SAR strips the payload 12 from that ATM cell 16 and stores it in memory 24. Subsequently, having received an ATM cell 18 for virtual channel Y, it similarly strips the payload 12 from that ATM cell 18 and stores it in another part of memory 24. In this way, in the two areas of memory 24, the SAR 22 builds up two de-interleaved packets 1 relating to respective virtual channels X and Y.

Once the SAR 22 receives an ATM cell 16 or 18 with a header 14 indicating that this is the last cell of a packet, the SAR knows that the de-interleaved data stored for that virtual channel in memory 24 is a complete packet. It may then check that the packet is the correct length according to the length code 6 and also check for errors using the CRC 8. Once this is all complete, the SAR can then provide the raw transmitted data 2 of a particular virtual channel for further processing in the system.

As is apparent from the above, a number of buffers or areas of memory are required to store the data packets 1 as they are reassembled and this can be a significant amount of memory. For example, if the data packets 1 are 2 kbytes long and 16 virtual channels are in use, then at least 32 kbytes are required and in practice a number of additional spare buffers are also required. In fact, data packets can be any size up to 64 kbytes so the problem can be a lot worse.

Figure 3:
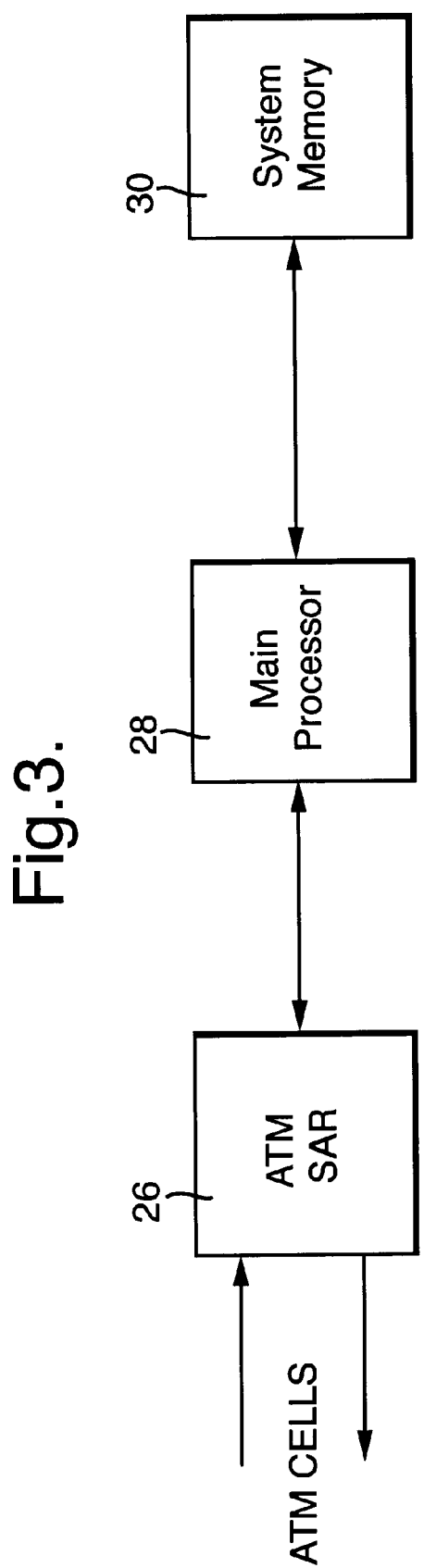
FIG. 3 illustrates schematically an arrangement embodying the present invention.

FIG. 3 illustrates schematically an embodiment of the present invention.

Unlike the previous SAR system, ATM processing is shared between the dedicated ATM SAR 26 and the main processor 28, which is also used to run the application code. This is particularly advantageous in the audio/video applications mentioned above, since the bit rate of the ATM cells is relatively low and the main processor 26 can handle the ATM traffic using only a small part of its processing power. In this respect, high power processors 28 are much cheaper than the required high power ATM SAR 22 of FIG. 1.

Like the SAR 22, the SAR 26 checks that a received ATM cell 16 is associated with a virtual channel in use, extracts the payload 12 of the ATM cell 16 and, if it is the last cell 16A of the AAL5 data packet 1, checks the AAL5 trailer information 4. However, unlike the SAR 22, the SAR 26 then produces a new header 14 for each ATM payload 12 and passes the payloads 12, together with their respective new headers to the main processor 28. Each new header may contain simplified de-interleaving information and may be stripped of the correction code for its respective cell 16. However, unlike the standard header 14, it contains information regarding the current status of the AAL5 trailer information 4 checks.

The main processor 28 receives the modified ATM cells from the SAR 26, strips them of their new headers and places the payloads 12 into the system memory 30 according to the virtual channel information in the stripped new headers. In fact, the main processor 28 may initially put the ATM cells with their modified headers in a single buffer and then post process them later to strip the header off and de-interleave the cells of different virtual channels into separate buffers.

In this way, the main processor 28 de-interleaves the ATM cells without the need for checking the AAL5 trailer information itself. If the new headers passed to it from the SAR 26 indicate that the length of the packet is incorrect or data within that packet is incorrect, the main processor can then take appropriate action, for instance correcting the data or ignoring it.

An SAR such as SAR 26 illustrated in FIG. 3 will now be described with reference to FIG. 4.

ATM cells 16, 18, 20 are received by the SAR 26 from an ATM cell interface 32 and are passed to an input unit 34. In some applications, the error correction codes of the individual ATM cells 16, 18, 20 will have already been checked by the cell interface. However, in other applications, the input units 34 may check these codes. The input unit 34 also identifies from the headers 14 which ATM cell 16, 18, 20 relate to a virtual channel in use.

To be consistent with the example described above, the SAR 26 will be described with reference to extracting ATM cells 16 and 18 relating respectively to virtual channels X and Y.

Thus, whenever the input unit 34 receives an ATM cell 16 or 18 relating to virtual channels X or Y, it passes the ATM header 14 and the payload 12 to a trailer checker 36. For each virtual channel in use, eg. in this case virtual channels X and Y, the trailer checker 36 keeps an ongoing record of the length and CRC status for a current packet 1, though it will be noted that it will not be possible to assess the final status of an ATM packet 1 until the last ATM cell 16A has been received.

Figure 4:
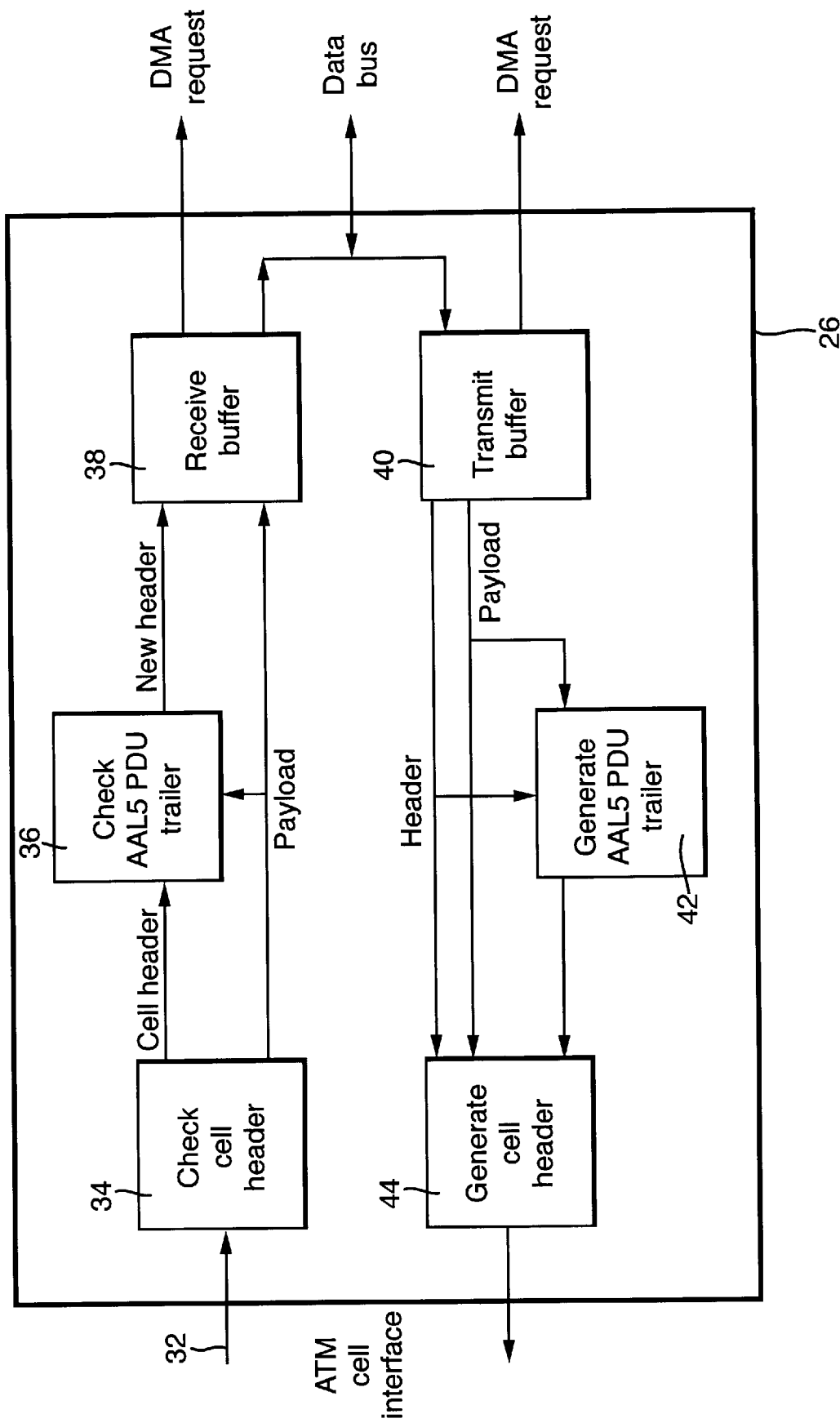
FIG. 4 illustrates an embodiment of the present invention.

As illustrated in FIG. 4, the ATM payload 12 is also passed directly to a receive buffer 38.

The trailer checker 36 generates the new ATM cell header mentioned above. This is also passed to the receiver buffer 38.

Thus, in the order in which ATM cells 16, 18 are received, the payloads 12 of those ATM cells 16, 18 are passed to the receiver buffer 38 with their new headers.

The new headers can, in fact, be identical to the standard headers except for the indication of the success of checking the AAL5 trailer 4. However, it is also possible for the headers to be changed substantially in format. They need not contain error correction codes for the ATM cells 16, 18 themselves. They would normally continue to include the bit indicating the last cell of a packet unless some other means were provided to indicate to the main processor 28 when the last cell is delivered. Also, the new header could contain a simplified indication of the virtual channel to which the particular cell is to be applied. For example, if 16 virtual channels are provided on the ATM cell interface, but only four are handled by the SAR 26 and processor 28, then the new header need not include data to distinguish between 16virtual channels, but only 4.

The receive buffer 38 is merely provided to act as a buffer with the processor 28 and DMA request. It might typically be of sufficient capacity to hold a single modified ATM cell, but it could conceivably be of smaller capacity than that. Certainly, there would be no need to buffer an entire ATM packet 1 and, indeed, in a buffer of such a size, the ATM cells of various virtual channels would still be interleaved anyway.

The receive buffer 38 activates a DMA request signal to the main processor 28 to indicate that there is some data to be read consisting of the cell payload 12 plus the modified header.

The main processor receives this data and demultiplexes it into the appropriate virtual channels. By stripping off the new header information, the original data can be reassembled and the validity checked according to the CRC status included in the modified header.

To transmit data on a particular virtual channel, the main processor 28 divides the data into suitable size pieces, eg. 48 bytes, as payloads 12 and adds a header which includes the virtual channel identity and an indication of the last cell. This header information can be of the modified type discussed above. However, since no information is required regarding the packet CRC, the header could also include the cell correction codes and be identical to the standard ATM cell header 14. The main processor 28 may intermingle or interleave these cells with cells for other virtual channels.

A transmit buffer 40 is provided in the SAR 26 and when the transmit buffer 40 has some empty space, it asserts its DMA request signal so that the main processor 28 can write the next cell to it.

The cell payload 12 and the header provided by the main processor 28 are both passed to a trailer generator 42. The trailer generator 42 keeps an ongoing record of CRC and length information for cells of a single packet for a respective virtual channel. When a header of a cell provided by the main processor 28 indicates that it is the last data cell, then the trailer generator 42 produces an appropriate AAL5 trailer 4 on the basis of the previous data cells which it has processed for that particular ATM packet.

An output unit 44 is provided to output ATM cells to the ATM cell interface 32. The output unit receives the cell payloads 12 from the transmit buffer 40, together with their headers. It also receives the additional ATM cell produced by the trailer generator 42 containing the AAL5 trailer.

Where the header provided by the main processor 28 is of the modified type, then the output unit 44 converts this header into an ATM header 14 of standard format. In any event, it must be ensured that the additional ATM cell 12A produced by the trailer generator 42 is indicated as being the last ATM cell 12A of its respective ATM packet 1.

According to another embodiment, rather than pass the header directly from the transmit buffer 40 to the output unit 44, the header can be provided to the trailer generator 42 and then passed from the trailer generator 42 to the output unit 44. In this way, the trailer generator 42 could also be responsible for modifying as necessary the ATM headers.

I claim:

1. An ATM circuit for use in re-assembly of ATM packets from ATM cells containing ATM payloads, the circuit comprising:

an input unit for receiving interleaved ATM cells derived from ATM packets relating to respective virtual channels; and a checker for checking the ATM cells of an ATM packet of a selected virtual channel with respect to ATM packet trailer information contained in the ATM cells of said ATM packet; wherein the ATM circuit is configured to output the ATM cell payloads in the original interleaved state.

2. A circuit according to claim 1 wherein the checker is additionally for producing check data representing the results of the checking and the ATM circuit is configured to output the check data together with corresponding ATM cell payloads.

3. A circuit according to claim 2, wherein the checker is for producing modified ATM cell headers including at least said checker data, said modified ATM cell headers being output from said ATM circuit with the corresponding ATM cell payloads.

4. A circuit according to claim 3, wherein said modified cell headers do not include cell error correction codes.

5. A circuit according to claim 3, wherein said modified cell headers include modified codes indicating the virtual channel to which a corresponding ATM cell payload belongs.

6. A circuit according to claim 3, further comprising:

an output unit for receiving ATM cell payloads of selected virtual channels and the respective modified ATM cell headers and for outputting the resulting modified ATM cells from the ATM circuit.

7. A circuit according to claim 1 wherein said input unit is for reading ATM cell headers of said ATM cells to determine to which virtual channel each ATM cell belongs and for providing to said checker the ATM cell payloads of only the selected virtual channels.

8. A circuit according to claim 1 wherein said input unit is for stripping ATM cell headers from ATM cells and for providing the resulting ATM cell payloads for output from the ATM circuit.

9. A circuit according to claim 1 additionally for use in segmentation of ATM packets into ATM cells and further comprising:

a receiver for receiving at least ATM cell payloads;

a generator for generating ATM packet trailer information for ATM cells of respective ATM packets; and an output for outputting interleaved ATM cells of a plurality of virtual channels including the generated ATM packet trailer information.

10. A circuit according to claim 1 constructed as an integrated circuit.

11. An ATM re-assembly circuit for re-assembly of ATM packets from ATM cells, the circuit comprising:

an ATM circuit according to claim 1;

a main processor for controlling the ATM re-assembly circuit;

a memory for storing deinterleaved ATM cell payloads of ATM packets; wherein the main processor is configured to receive the ATM payloads output by the ATM circuit and to deinterleave the ATM cell payloads by storing the ATM cell payloads in the memory.

12. A digital set top box including a circuit according to claim 1.

13. A digital set top box including a circuit according to claim 11.

14. A method of assembling ATM packets relating to respective virtual channels from interleaved ATM cells containing respective ATM payloads, the method comprising:

receiving the interleaved ATM cells;

checking each ATM cell of an ATM packet of a selected virtual channel with respect to the ATM packet trailer information contained in the ATM cells of said ATM packet;

generating check data for each ATM cell indicating the results of the step of checking;

outputting the interleaved ATM cell payloads, together with the check data to a main processor; and operating the main processor to deinterleave the ATM cell payloads of respective virtual channels to assemble ATM packets of respective virtual channels.

15. A method of reducing the workload of an ATM assembly circuit for assembling ATM packets relating to respective virtual channels from interleaved ATM cells containing ATM payloads, the method comprising:

configuring the circuit to a) check each interleaved ATM cell of an ATM packet of a selected virtual channel with respect to the ATM trailer information contained in the ATM cells of said ATM packet without deinterleaving the ATM cells, b) generate check data for each ATM cell indicating the results of the checking and c) transmit the interleaved ATM cell payloads together with the check data; and providing a processor to receive the ATM cell payloads and check data and to store the ATM cell payloads in a memory in a deinterleaved state.

* * * * *